United States Patent [19]
Conlee et al.

[11] Patent Number: 5,575,599
[45] Date of Patent: Nov. 19, 1996

[54] CONTAINER LOCK PIN SYSTEM

[75] Inventors: Joseph A. Conlee; Bruce A. Harder, both of Mishawaka; David A. Penzenik, South Bend, all of Ind.

[73] Assignee: Penz Products, Inc., Mishawaka, Ind.

[21] Appl. No.: 227,972

[22] Filed: Apr. 15, 1994

[51] Int. Cl.⁶ ..................................... B60P 7/13
[52] U.S. Cl. ................. 410/69; 410/70; 410/76; 410/77
[58] Field of Search ................ 410/69, 73, 74, 410/76, 80, 81, 90, 91, 70, 71, 72, 75, 77, 84, 89; 292/332, 335, 181, 153, 173, 139

[56] References Cited

U.S. PATENT DOCUMENTS

| | | | |
|---|---|---|---|
| 1,966,492 | 7/1934 | Fildes | 410/70 |
| 1,988,651 | 1/1935 | Fildes | 410/72 |
| 2,424,429 | 7/1947 | Bamberg | 410/69 X |
| 3,259,400 | 7/1966 | Tantlinger et al. | 410/90 X |
| 3,272,150 | 9/1966 | Dempster et al. | 410/77 |
| 3,399,921 | 9/1968 | Trost et al. | |
| 3,431,017 | 3/1969 | Joseph | 410/80 |
| 3,653,521 | 4/1972 | Bridge | 410/80 X |
| 4,352,517 | 10/1982 | Bertolini | 410/76 X |

*Primary Examiner*—David A. Bucci
*Assistant Examiner*—Stephen Gordon
*Attorney, Agent, or Firm*—Baker & Daniels

[57] ABSTRACT

A container lock pin system for automatically connecting a container to a vehicle. During loading of a container onto the transport vehicle, a lever is actuated to cause a lock pin to engage the container. The lock pin extends into a bore in the container. A biasing mechanism causes the lock pin to disengage from the container when the container is hoisted from the vehicle.

8 Claims, 5 Drawing Sheets

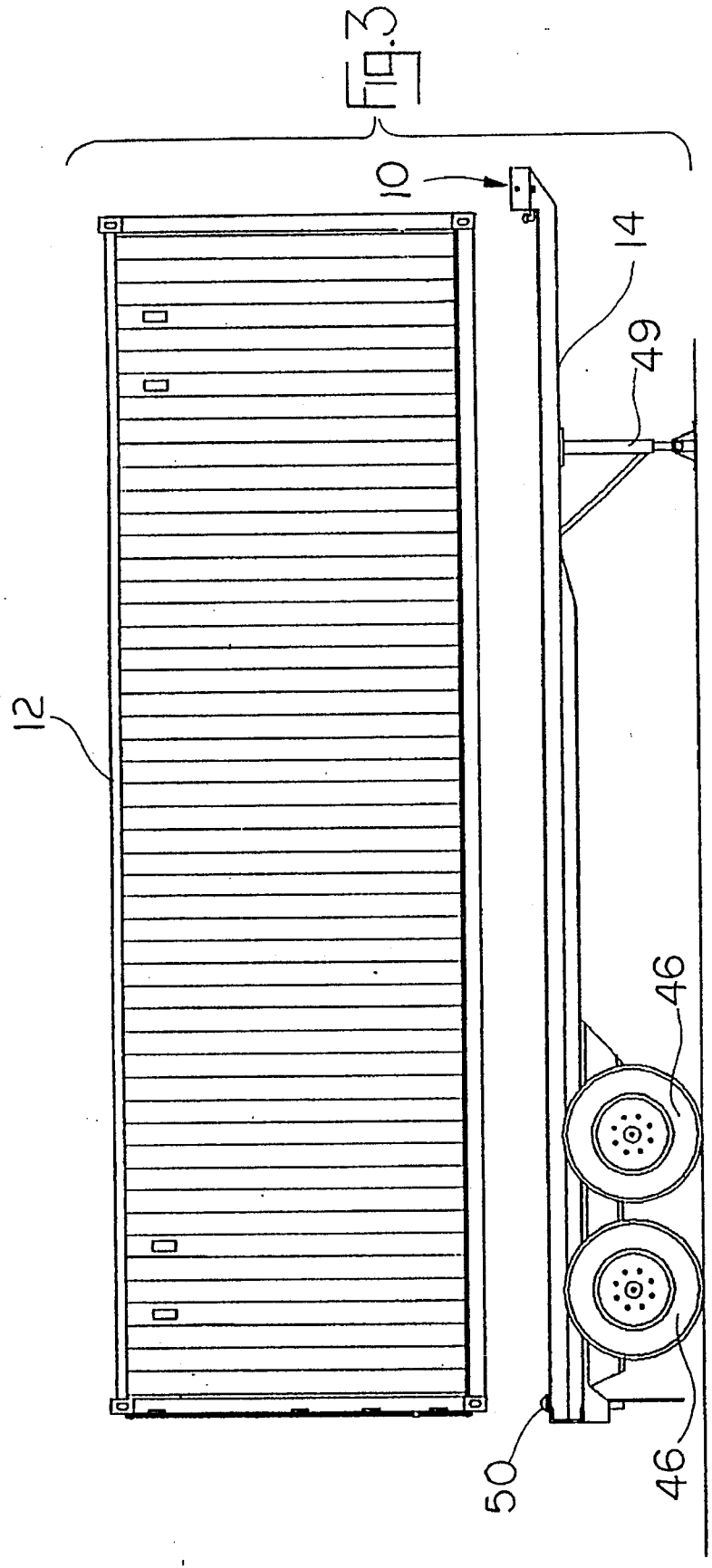

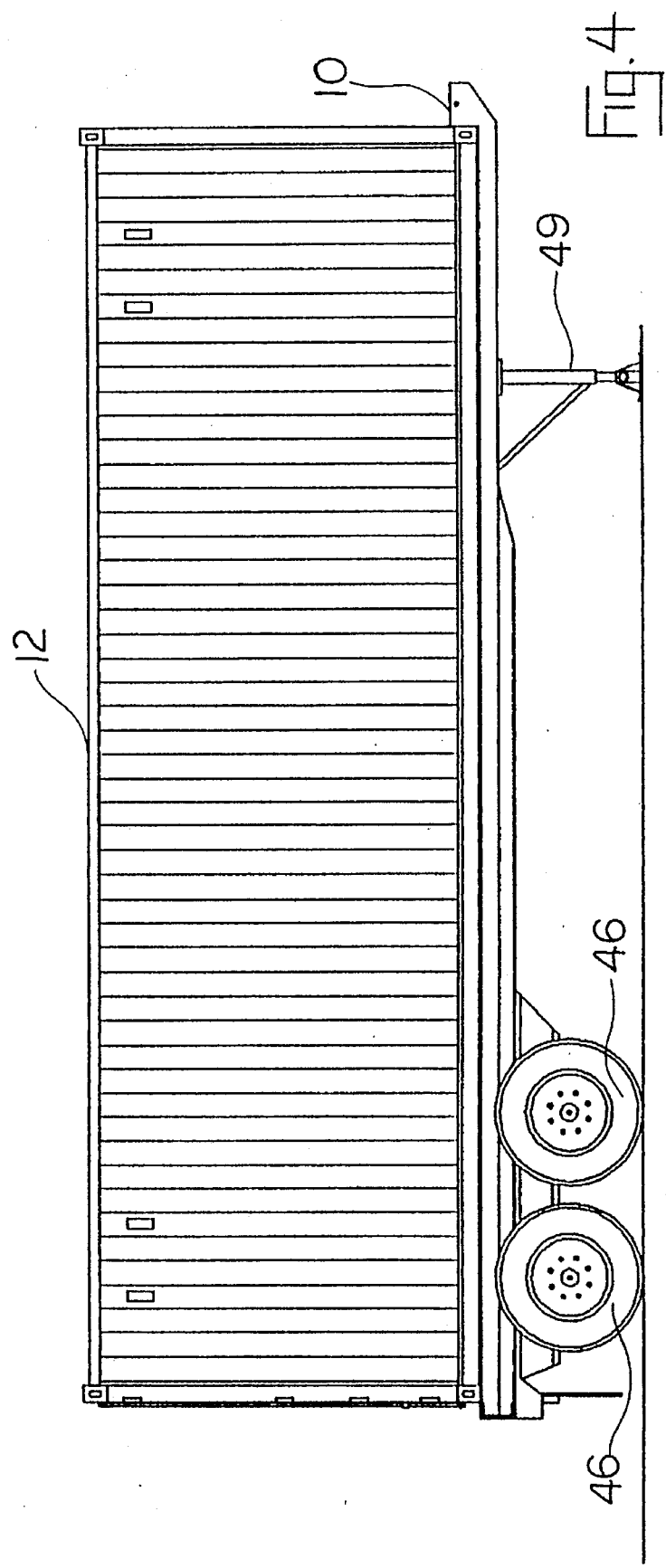

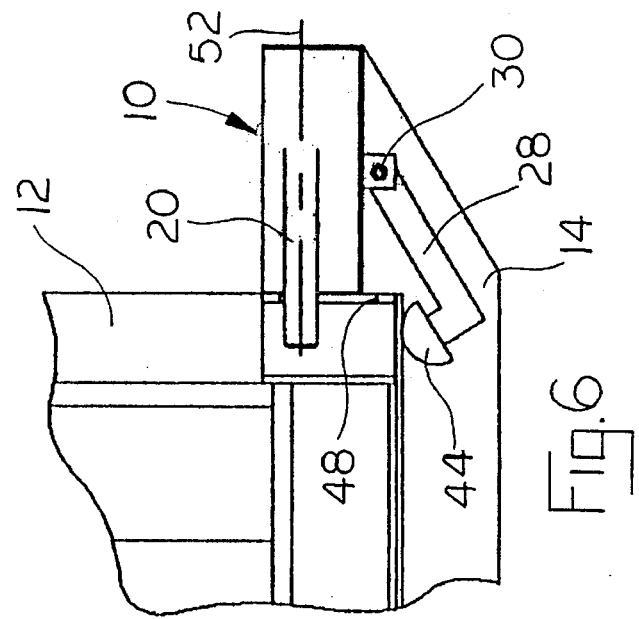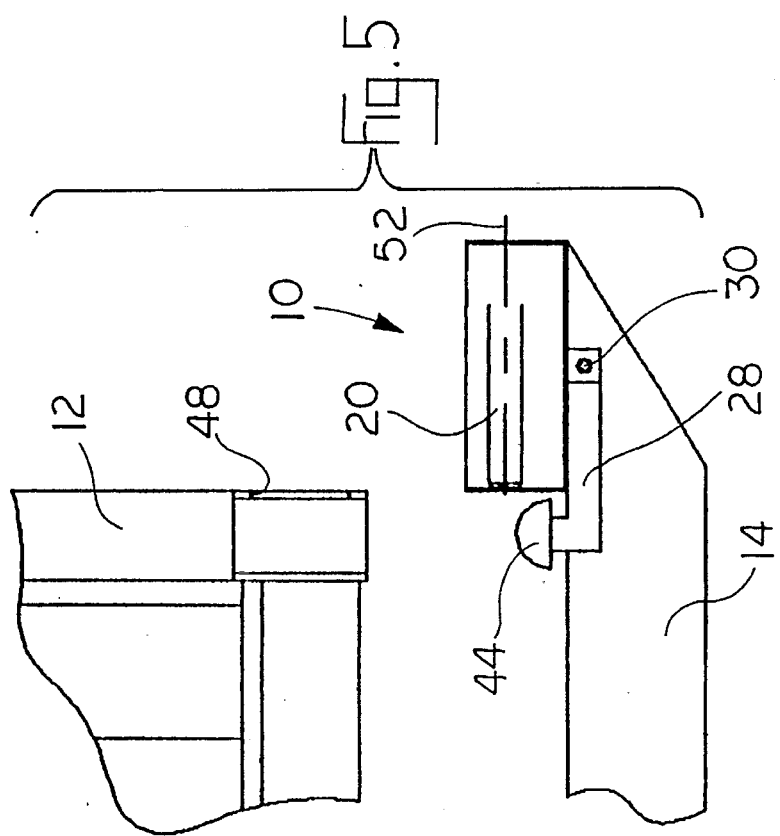

5,575,599

CONTAINER LOCK PIN SYSTEM

BACKGROUND OF THE INVENTION

This invention pertains to a container locking system for attaching transport containers to vehicles such as railroad cars, ships and trailers. In particular the invention relates to an automatic lock pin to automatically connect together the container and vehicle.

In general, prior art vehicles for transport of standardized shipping containers included a lock pin to positively lock the container to the vehicle before movement. Containers utilized in modern transportation systems are of a standardized size which may be loaded by a crane directly from an ocean going ship to and between a railroad car or tractor trailer. The prior attachment method included a lock pin engaged by an operator beneath the container. A set of twist locks on the rear end of the vehicle is also used to lock the rear of the container to the vehicle.

Problems with the apparatus include instances of the operator forgetting to release the lock pin at the front of the container. At times a crane operator, not knowing the lock pin was still engaged, would lift the vehicle along with the container. The vehicle would stay attached to the container until the lock pin would break or slide free.

SUMMARY OF THE INVENTION

The present invention overcomes the disadvantage of the above described prior art container system by providing an automatic lock pin for use in connecting containers to transport vehicles.

More specifically the invention provides a lock pin attached to a vehicle for horizontal movement, slidable toward the container. A lever is connected to the vehicle and the lock pin so that when the lever is actuated the lock pin moves towards and engages the container. During loading of the container on the vehicle, the container is located on the lever to actuate it. The lever causes the lock pin to automatically engage the container thereby locking the container to the vehicle.

An advantage of the container locking system of the present invention is that it eliminates personnel from service under the vehicle to engage or disengage the container lock pin. The invention also prevents operator error, by eliminating the need to disengage the lock pin during removal of the container from the vehicle.

Another advantage of the container locking system of the present invention is that the lock pin activation is automatic requiring no operator intervention other than lowering the container onto the vehicle.

Yet another advantage of the container locking system of the present invention is that it requires few moving parts thereby insuring long life in hostile or corrosive environments such as under tractor trailers or aboard ships.

The invention, in one form thereof, provides a container locking system for locking a container to a vehicle. The system includes a lock pin means connected to the vehicle for horizontal movement with the lock pin means slidable toward the container, and a lever means connected to the vehicle and to the lock pin means. The lever means slides the lock pin means toward the container when depressed or actuated. The lock pin means automatically engages the container when the container actuates the lever means during loading of the container onto the vehicle. When the lock pin means engages the container, the container becomes locked to the vehicle.

In one form of the invention, a biasing means is attached to the link pin means to urge the lock pin means away from the container when the lever means is released.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein:

FIG. 3 is an elevational view of a container prior to attachment to a vehicle;

FIG. 4 is an elevational view of a container locked to a vehicle;

FIG. 5 is a fragmentary diagrammatic view of the container locking system prior to lock pin activation; and FIG. 6 is a fragmentary diagrammatic view of the container locking system after lock pin activation.

Corresponding reference characters indicate corresponding parts throughout the several views. The exemplification set out herein illustrates one preferred embodiment of the invention, in one form, and such exemplification is not to be construed as limiting the scope of the invention in any manner.

DETAILED DESCRIPTION OF THE INVENTION

Figure 1:
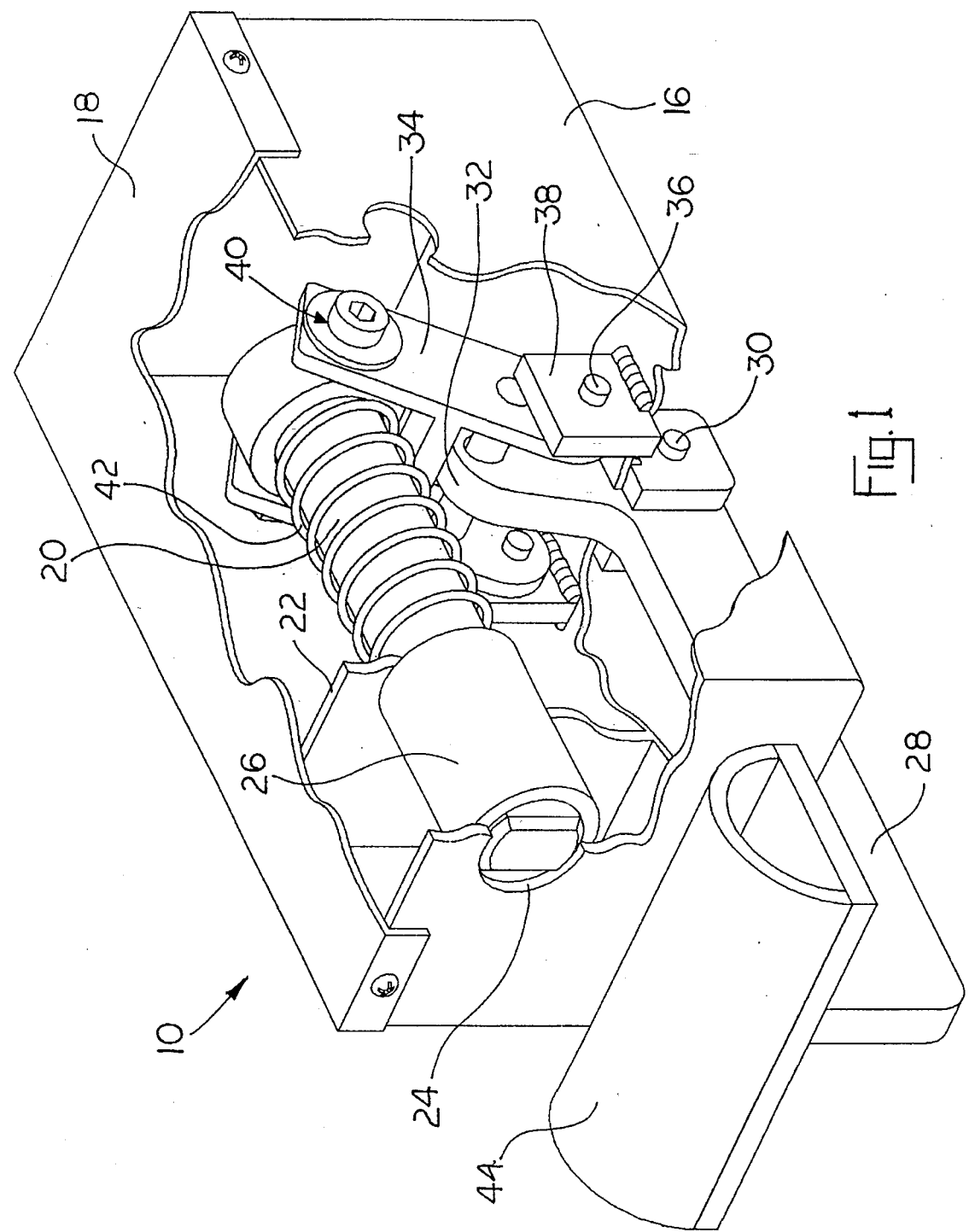
FIG. 1 is a fragmentary view of one embodiment of the present invention.

An exemplary embodiment of the invention is shown in the drawings, in particular by referring to FIG. 1, is shown a container locking system 10 for automatically engaging and locking a container 12 to a vehicle 14. The container locking system 10 of the present invention utilizes the weight of a container 12 to actuate the locking mechanism.

Figure 2:
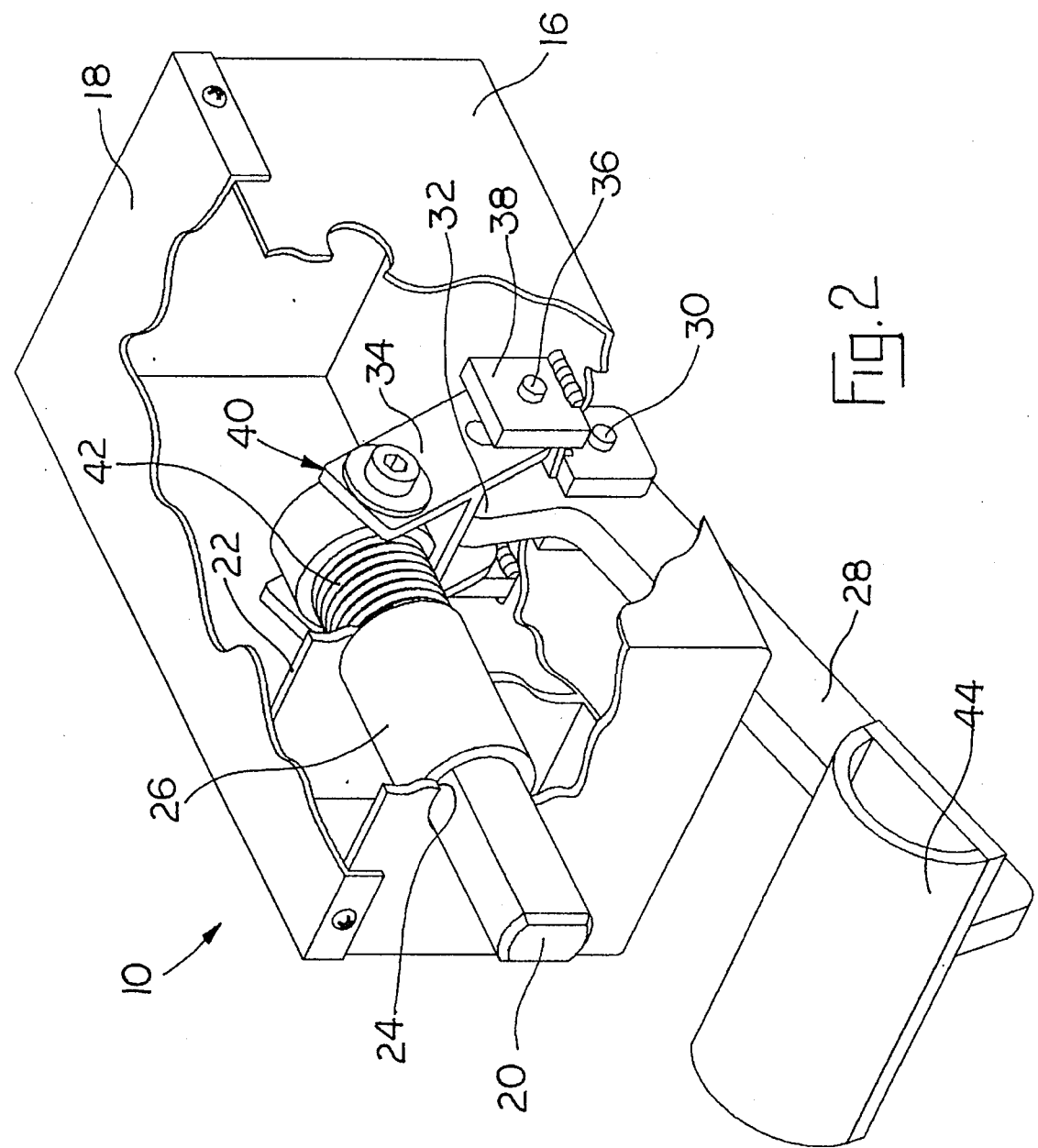
FIG. 2 is a fragmentary view of one embodiment of the present invention shown in its activated state.

As shown in FIGS. 1 and 2, a housing 16 with an attached top cover 18 encloses a horizontally disposed locking pin means, such as lock pin 20. Lock pin 20 is situated for slidable movement along its axis 52, depicted in FIGS. 5 and 6, toward container 12 through interior partition 22 of housing 16 and a opening 24 in a sidewall of housing 16. A cylindrical collar 26 may be disposed between the interior partition 22 and opening 24 about lock pin 20 to prevent water and other foreign debris from entering housing 16. A lever means, such as lever 28, is connected to both vehicle 14 and housing 16 by a pivot pin 30. Lever 28 is connected to lock pin 20 so that actuation of lever 28 will cause lock pin 20 to slide forward, as shown in FIG. 2. Distal end 32 of lever 28 is pivotably attached to linkage 34. Linkage 34 is pivotably attached to housing 16 via a pivot pin 36 and bracket 38. Linkage 34 is also attached to lock pin 20 by means of a pivoting hinge 40.

In one form of the invention, a biasing means such as spring 42 is attached to link pin 20, or alternatively to either linkage 34 or lever 28, to urge lock pin 20 to its unactuated position as shown in FIG. 1. Spring 42 is used to force lock pin 20 away from container 12 when lever 28 is released or actuated. Lever 28 further includes a horizontally disposed contact pad 44 on its proximal end to increase contact area with container 12.

In operation, container locking system 10 may be utilized with a vehicle 14, such as a tractor trailer as shown in FIGS. 3 and 4. Alternatively, other vehicles such as railroad cars, ships or other types of transport vehicles may equivalently be utilized. Container 12, as shown in FIGS. 3 and 4, is of conventional design such as standardized shipping containers known in the art. Vehicle 14 includes a plurality of tires 46 along with a standard trailer jack 49.

An enlarged view of container locking system 10 in use with a container 12 is shown in a fragmentary view in FIG. 5. Container 12 is first lowered toward vehicle 14 as by a loading crane as is known in the art. As shown in FIG. 5, container locking system 10 is in its unactuated position wherein locking pin 20 is biased by spring 42 to a location where it cannot interfere with container 12. As container 12 is lowered onto vehicle 14 it contacts contact pad 44 of lever 28. This contact actuates lever 28, moving it about pivot pin 30, and causing lock pin 20 to slide and extend forward. As shown in FIG. 6, lock pin 20 slides into a horizontal bore 48. In other words, when container 12 is placed onto vehicle 14, lever 28 is actuated thereby causing lock pin 20 to automatically engage the container and thereby lock container 12 to vehicle 14. Additionally, vehicle 14 includes twist locks 50 to lock and stabilize the opposite side or rear end of container 12 to vehicle 14. Twist locks 50 are known in the art and form no part of the invention.

During removal of container 12 from vehicle 14 via a crane or hoist, all that is necessary to unlock container 12 from vehicle 14 is to unlock twist locks 50. When container 12 is hoisted from vehicle 14, thereby disengaging itself from lever 28 and contact pad 44. The biasing means, such as spring 42, causes the lock pin 20 to retract back into housing 14. This retraction of lock pin 20 permits the container 12 to totally separate from vehicle 14. By automatically engaging and disengaging the lock pin 20 via the location of container 12, manual actuation of the lock pin is eliminated.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A container locking system for locking a container to a vehicle, said system comprising;

a lock pin means connected to said vehicle for horizontal movement, said lock pin means slidable toward the container;

a lever means connected to said vehicle and said lock pin means for sliding said lock means toward the container when the container is placed on said lever means whereby said lock pin means automatically engages the container thereby locking the container to the vehicle;

said lock pin means being pivotally connected to said lever means.

2. The container locking system of claim 1 further comprising a biasing means attached to said lock pin means, said biasing means for urging said lock pin means away from the container solely in response to when said lever is released upon lifting of said container from said vehicle.

3. The container locking system of claim 2 in which said biasing means comprises a spring.

4. The container locking system of claim 1 in which the container includes a horizontal bore, said lock pin means slidable into said horizontal bore when said lever means is actuated.

5. The container locking system of claim 1 in which said lock pin means has a longitudinal axis, said horizontal movement of said lock pin means being along said longitudinal axis.

6. The container locking system of claim 5 wherein said vehicle includes a cylindrical collar means, said lock pin means is slideably positioned within said collar means, said collar means for directing said horizontal movement of said lock pin means along said longitudinal axis.

7. The container locking system of claim 1 wherein said lever means includes a link and a movable lever, said link having one end pivotally connected to said lever and another end pivotally connected to said lock pin means, said link constituting means for translating the movement of said lever to said horizontal movement of said lock pin means.

8. The container locking system of claim 7 wherein said link is pivotally connected to said vehicle and said lever has a free end adapted to contact said container and an opposite end pivotally connected to said vehicle.

* * * * *